United States Patent [19]

Sheesley

[11] 3,733,914

[45] May 22, 1973

[54] MOTION CONVERSION MEANS
[75] Inventor: John M. Sheesley, Houston, Tex.
[73] Assignee: Research Engineering Company, Houston, Tex.
[22] Filed: June 1, 1971
[21] Appl. No.: 148,603

[52] U.S. Cl.............................74/89.15, 74/424.8 A
[51] Int. Cl................................................F16h 27/02
[58] Field of Search......................74/89.15, 424.8 A

[56] References Cited

UNITED STATES PATENTS 1,301,531  4/1919  Ackerman et al...............74/424.8 A
2,556,572  6/1951  Brinkhurst......................74/424.8 A
1,721,227  7/1929  Manley...........................74/424.8 A
2,463,263  3/1949  Gordon ..........................74/424.8 A Primary Examiner—Charles J. Myhre
Assistant Examiner—Wesley S. Ratliff, Jr.
Attorney—Robert W. B. Dickerson

[57] ABSTRACT

A device for converting rotary motion of one member into linear motion of a further member. Rotating member, such as a spur gear rotates an intermediate, internally and externally toothed or threaded nut. The internal threads may be caused to engage or disengage the external threads on a linearly moveable rod member, causing such linear motion thereof.

9 Claims, 3 Drawing Figures

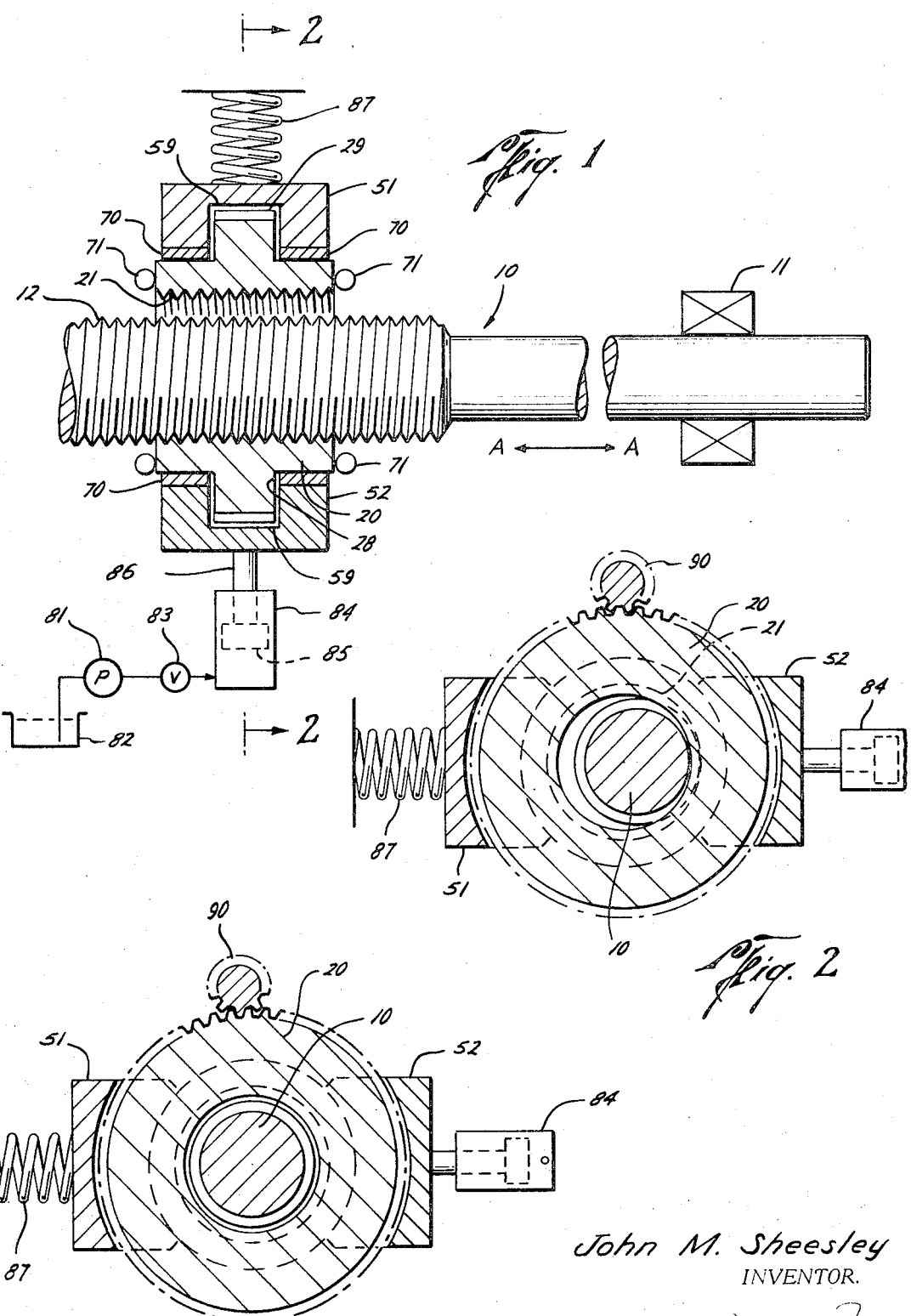

MOTION CONVERSION MEANS

BACKGROUND OF THE INVENTION

There are widespread applications for the conversion of one type of motion, such as rotary, of one member, into another type of motion, such as linear, of a further member. General areas of the application of such devices include many machine tools, as well as actuators for other devices including valve actuators. In the operation of such devices, it is oftentimes desireable to have easily engageable and disengageable driving and driven members. It is to this problem or area of operation that applicant's invention is directed.

SUMMARY OF THE INVENTION

A driving member may comprise a rotatable spur gear or even a worm. A driven member may comprise an exteriorly threaded rod. Intermediate the two may be a rotating nut that is driven by the driving member and is radially movable so that its internal teeth or threads are engageable or disengageable with the rod. When so engaged, rotation of the driving member will result in linear movement of the driven rod.

DESCRIPTION OF THE DRAWINGS

FIG. 1 is partly schematic, axial section through the driving mechanism; and

FIG. 2 and 3 are views taken along line 2—2 of FIG. 1, FIG. 3 showing the parts in disengaged position, and FIG. 2 showing them engaged.

DESCRIPTION OF A PREFERRED EMBODIMENT

In the drawings the driven member, indicated at 10, is an exteriorly threaded rod. This rod is linearly movable as indicated by arrows A—A. The rod may be supported by bearings 11 positioned in the superstructure of the housing, which housing is not shown. This linear motion could provide directly usable linear motion, as in punching operations, or may cause rotary motion of a further engageable part, such as of a yoke mechanism in a valve actuator.

The power structure mechanism may vary, i.e., may range from mechanical hand wheel operation to hydraulic sources of power. The latter is illustrated schematically in FIG. 1, the particular form depicted not being critical to this invention. As shown, however, pump 81 withdraws fluid from reservoir 82. Valve 83 directs such fluid, which would be under considerable pressure, to piston containing cylinder 84, for reciprocation in the normal manner of piston 85 contained therein. Porting and conduits could be provided for evacuating fluid from the cylinder during the return stroke. The return stroke would be effected by spring 87 exerting a force against shoe 51, opposite cylinder 84.

The driving mechanism unique to this invention includes rotating nut 20. This nut is internally threaded at 21, for meshing with the exterior threaded portion 12 of rod 10. Obviously various types of teeth or threads may be used. So use of the term "threadedly engageable" or like terms should not be limiting. It can be seen, especially in FIGS. 2 and 3, that the internal diameter of nut 20 is substantially greater than the external diameter of threaded portion 12 of rod 10. The nut is caused to become engaged or disengaged with rod 10 by virtue of piston rod 86, which in turn is linked to shoe 52. This shoe engages shoulders formed at the exterior of nut 20 through bushings 70. Thrust bearings 71 may be positioned adjacent the axial periphery of nut 20 to absorb end thrust. Lug or annular nut extension 28 extends radially outward of nut 20, and is threaded, as at 29. This threaded portion is engaged by mating threads or teeth carried by spur gear 90. Similar gears, including worms could be utilized with slight modifications, to rotate nut 20. This lug extension is received within recessed portions 59 of shoes 51 and 52.

In operation, the pump-valve-porting means, or other power supply mechanism, causes movement of piston 85 and its related piston rod and shoe 52. On such power being supplied as in FIG. 1, the lower shoe exerts a force against nut 20 so as to cause threaded engagement of portion 21 with the threads of rod 10. Drive means (not shown) cause rotation of gear 90 and thereby of nut 20. By virtue of the previously described engagement, rotation of nut 20 is translated into linear motion of rod 10. Thus, there is a conversion of rotary motion into linear rod movement with resultant work performed by rod 10 and/or any mechanism connected thereto. By simply reversing valve 83, the fluid may be exhausted. Force in the opposite direction would be exerted by spring 87 and would force nut 20 downwardly in FIG. 1, removing the linkage between the nut 20 and rod threads 12 (See FIG. 3).

Although only a single embodiment has been depicted, it should be obvious that numerous modifications would be possible by one skilled in the art without departing from the spirit of the invention, the scope of which is intended to be limited only by the following claims:

1. Motion conversion device comprising:
   longitudinally movable, exteriorly threaded output means;
   rotatable interiorly threaded member having said interiorly threaded portion engageable with said exteriorly threaded portion of said output means, said interiorly threaded portion having a greater diameter than the exterior diameter of said exteriorly threaded output means portion;
   combination means for causing said rotatable member to become engaged with said output means and to become disengaged from said output means.

2. The device of claim 1 and including:
   further means, said means being for causing rotation of said rotatable member.

3. The device of claim 2 and including means for restricting lateral movement of said rotatable member.

4. The device of claim 2 wherein said rotation causing means includes exterior threads on said rotatable member and a gear device mating with said exterior threads.

5. The device of claim 2 wherein said combination means include a pair of oppositely disposed shoes adapted to exert oppositely directed forces against said rotatable member.

6. The device of claim 2 and including means for absorbing the lateral thrust of said rotatable member.

7. The device of claim 1 wherein said combination means includes piston means for causing one of said engagement or disengagement.

8. The device of claim 1 wherein said combination means includes spring means for causing one of said engagement or disengagement.

9. In a motion conversion device having a power supply to cause piston reciprocation, the combination of:

shoe device linked to said piston for movement therewith and said shoe engageable with a rotatable nut device having exterior and interior threads;

said interior threads being releasably engageable with exterior threads carried by a longitudinally movable output member;

the interior diameter of said nut device being greater than the outer diameter of said output threads;

means for causing engagement and disengagement of said nut threads and said rod threads; and means for causing rotation of said nut device.

* * * * *